United States Patent [19]

Yonan

[11] 3,910,915

[45] Oct. 7, 1975

[54] 1-ARYL-2-[(SUBSTITUTED AMINO)ALKANOYL]-1,2,3,4-TETRAHYDROISOQUINOLINES

[75] Inventor: Peter K. Yonan, Morton Grove, Ill.

[73] Assignee: G. D. Searle & Co., Chicago, Ill.

[22] Filed: July 23, 1973

[21] Appl. No.: 381,854

[52] U.S. Cl. .................. 260/268 BQ; 260/247.2 A; 260/208 BQ; 260/287 R; 424/250
[51] Int. Cl.² ........................................ C07D 295/10
[58] Field of Search .. 260/287 R, 268 BQ, 247.2 A, 260/288 R, 288 A

[56] References Cited
UNITED STATES PATENTS
3,745,162   7/1973   Helsley............................ 260/287 R Primary Examiner—Donald G. Daus
Assistant Examiner—Jose Tovar
Attorney, Agent, or Firm—John J. Kolano

[57] ABSTRACT

1-Aryl-2-[(substituted amino)alkanoyl]-1,2,3,4-tetrahydroisoquinolines having anti-arrhythmic, anti-bacterial, anti-fungal, anti-algal, anti-protozoal and anthelmintic activity are described herein. The subject compounds can be prepared by reacting a 1-aryl-2-(chloro-alkanoyl)-1,2,3,4-tetrahydroisoquinoline with the appropriate secondary amine.

4 Claims, No Drawings

1-ARYL-2-[(SUBSTITUTED AMINO)ALKANOYL]-1,2,3,4-TETRAHYDROISOQUINOLINES

The present invention relates to a group of 1-aryl-2-[(substituted amino)alkanoyl]-1,2,3,4-tetrahydroisoquinolines. More particularly, the present invention relates to a group of compounds having the general formula

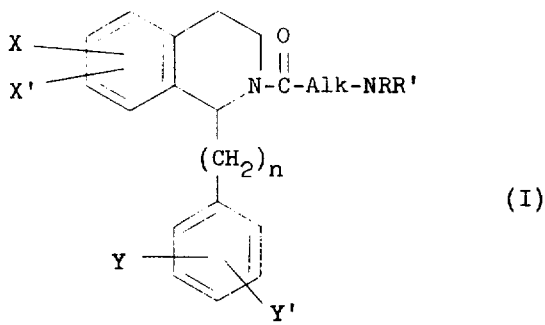

(I)

wherein X and X' are each selected from the group consisting of hydrogen, lower alkoxy, hydroxy, benzyloxy and lower alkyl, or X and X' together represent a single methylenedioxy or ethylenedioxy group; Y and Y' are each selected from the group consisting of hydrogen, halogen and lower alkoxy; n is selected from the group consisting of 0 and 1; Alk is lower alkylene separating the atoms attached thereto by at least 2 carbon atoms; and NRR' is selected from the group consisting of di(lower alkyl)amino, N-cycloalkyl(lower alkylamino), 1-pyrrolidinyl, hexamethyleneimino, morpholino, piperidino, 4-phenylpiperidino, 4-benzylpiperidino, 4-methyl-1-piperazinyl and 4-phenyl-1-piperazinyl.

The lower alkoxy groups referred to above contain 1 to 6 carbon atoms and are exemplified by groups such as methoxy, ethoxy, propoxy and isopropoxy. The lower alkyl groups likewise contain 1 to 6 carbon atoms and can be exemplified by methyl, ethyl, propyl, isopropyl and the like. Examples of di(lower alkyl)amino groups would then be dimethylamino, diethylamino, dipropylamino, diisopropylamino and the like. The lower alkylene groups referred to above contain 2 to 6 carbon atoms and can be exemplified by groups such as ethylene, propylene, trimethylene and 1,4-pentylene. The halogen atoms include fluorine, chlorine, bromine and iodine. The cycloalkyl groups contain 5 to 7 carbon atoms and include cyclopentyl, cyclohexyl and cycloheptyl.

Equivalent to the compounds of formula (I) for the purposes of this invention are the pharmaceutically acceptable acid addition and quaternary ammonium salts thereof. Such acid addition salts can be derived from a variety of organic and inorganic acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. Similarly, the quaternary ammonium salts can be derived from a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide and crotyl bromide.

The compounds of this invention are useful because of their pharmacological properties. In particular, they possess activity as anti-arrhythmic agents. Thus, they bring about a return to normal heart rhythm in animals in which the heart rhythm has become irregular.

The anti-arrhythmic utility of the instant compounds is evident from the results of a standardized test for their capacity to slow the ventricular tachycardia induced by aconitine in the isolated rabbit heart. The procedure is essentially that described by Lucchesi [J. Pharmacol. Exp. Therap., 137, 291 (1962)], modified in certain particulars as follows: Hearts are obtained from adult albino rabbits of either sex and perfused in apparatus modeled after that devised by Anderson and Craver [J. Pharmacol. Exp. Therap., 93, 135 (1948)]. The composition of the perfusion solution is the same as Lucchesi's, but the volume is increased to 200 ml. and the temperature lowered to 28°C. Aconitine (ordinarily as the nitrate) is administered as soon as the heart beat is regular and the EKG pattern normal, the dose being so selected as to at least double the rate. Typically, 0.05 ml. of 0.1% aconitine nitrate in physiological saline is injected. EKG's are recorded at 5 minute intervals after onset of ventricular tachycardia until two successive readings show stabilization of the rate. Perfusate collected during this time is discarded and replaced with fresh solution q.s. 200 ml. Promptly following stabilization, 2 mg. of compound dissolved or suspended in 1 ml. of physiological saline is mixed with the perfusion solution. Ten minutes later a like amount is introduced, followed after a further 10 minutes by double the first amount. Final concentration of compound in the perfusion solution is thus 40 mg. per liter. Recording of EKG's is continued at 5 minute intervals throughout this time and for 10 minutes thereafter. A compound is considered antiarrhythmic if, at any time during the 30 minutes immediately following initial administration in at least half of a minimum of two tests, it reduces by 50 percent or more the rate recorded ten minutes after onset of tachycardia. Among the compounds of this invention which have been found particularly active in this test are the representative compounds 2-[3-(4-benzylpiperidino)propionyl]-6,7-dimethoxy-1-phenyl-1,2,3,4-tetrahydroisoquinoline; 6,7-dimethoxy-1-phenyl-2-[3-(4-phenylpiperidino) propionyl]-1,2,3,4-tetrahydroisoquinoline; and 6,7-dimethoxy-1-phenyl-2-[3-(4-phenyl-1-piperazinyl) propionyl]-1,2,3,4-tetrahydroisoquinoline (as the dihydrochloride).

The compounds of the present invention also possess anti-biotic activity against a variety of microorganisms. Thus, they inhibit the growth of bacteria such as *Bacillus subtilis* and *Erwinia sp.*, fungi such as *Trichophyton mentagrophytes* and *Verticillium albo-atrum*, algae such as *Chlorella vulgaris* and protozoa such as *Trichomonas vaginalis*. In addition, they possess anthelmintic activity. By virtue of their anti-biotic activity, these compounds can be combined with various known excipients and adjuvants in the form of dusts, solutions, suspensions, ointments and sprays to provide compositions useful for disinfecting purposes.

The compounds of the present invention can be conveniently prepared by contacting a compound of the formula

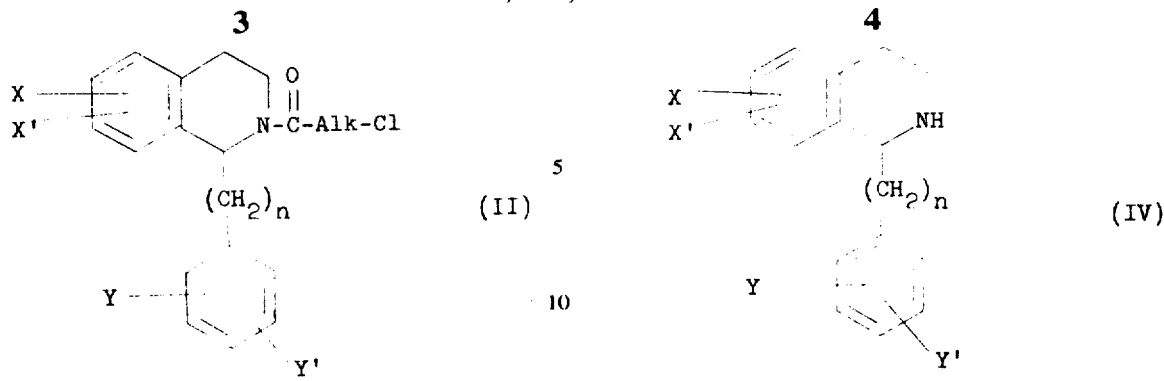

with the appropriate secondary amine of the formula $$H—NRR'  \quad (III)$$

wherein X, X', Y, Y', n, Alk and NRR' are defined as before. Depending on the nature of the reactants, it is possible to carry out this reaction in the presence or absence of a solvent. The use of a solvent is, however, generally preferred. An especially desirable solvent is 2-butanone, while other possible solvents would include aromatic hydrocarbons such as benzene and toluene, ketones such as acetone, alcohols such as methanol and ethanol, and dimethylformamide. The reaction proceeds in the presence of an acid acceptor. Excess amine reactant of formula (III) above can serve as the acid acceptor or, alternatively, a separate acid acceptor, for example a tertiary amine (e.g., N-methylmorpholine, trimethylamine or, preferably, triethylamine) can be added to the reaction mixture. Another acceptable acid acceptor would be potassium carbonate, particularly when dimethylformamide or 2-butanone is used as the solvent. Time and temperature are not critical factors. Reaction temperatures can vary from room temperature to approximately 100°C., with a temperature range of room temperature to 60°–70°C. being typical. Time varies from a few hours to several days, depending on the particular temperature employed.

The compounds of formula (I) wherein X and/or X' are/is hydroxy can be prepared from the corresponding compounds of formula (I) wherein X and/or X' are/is benzyloxy. Debenzylation is conveniently effected by catalytic hydrogenolysis. Suitable catalysts include platinum, Raney nickel, copper-chromium oxide and palladium (optionally on a support), a particularly preferred catalyst being palladium-on-carbon. The hydrogenation is conveniently conducted in a solvent, the choice of solvent depending upon the particular starting material employed. Generally speaking, a wide variety of solvents, such as lower alkanols (e.g., methanol, ethanol and 2-propanol), ethers (e.g., tetrahydrofuran), water, and acetic acid, could be used. The reaction is generally conducted at a temperature ranging from room temperature to 100°C., with a temperature range of room temperature to 50°–60°C. being typical.

The starting materials of formula (II) above can be readily prepared by contacting a compound of the formula wherein X, X', Y, Y' and n are as hereinbefore defined, with a compound of the formula $$Cl—\overset{\overset{O}{\|}}{C}—Alk—Cl$$

wherein Alk is as hereinbefore defined.

The invention will appear more fully from the examples which follow. These examples are given by way of illustration only and are not to be construed as limiting the invention either in spirit or in scope as many modifications both in materials and methods will be apparent to those skilled in the art. In these examples, temperatures are given in degrees centigrade (°C.) and quantities of materials are expressed in parts by weight unless otherwise specified. The relationship between parts by weight and parts by volume is the same as that existing between grams and milliliters.

EXAMPLE 1

A mixture of 50 parts of 3-benzyloxy-4-methoxybenzaldehyde, 25 parts of nitromethane, 2.1 parts of glacial acetic acid and 2.2 parts of n-butylamine in 39.5 parts of ethanol is heated until dissolved. The resulting solution is allowed to stand overnight. The crystals which form are separated by filtration and washed with ethanol. There is thus obtained 3-benzyloxy-4-methoxy-β-nitrostyrene, melting at about 126°–128°C.

Substitution of a like quantity of 4-benzyloxy-3-methoxybenzaldehyde for the 3-benzyloxy-4-methoxybenzaldehyde used above and substantial repetition of the foregoing procedure gives 4-benzyloxy-3-methoxy-β-nitrostyrene, melting at about 118°–121°C.

Substitution of an equivalent quantity of 3,4-methylenedioxybenzaldehyde or 3,4-ethylenedioxybenzaldehyde for the 3-benzyloxy-4-methoxybenzaldehyde used above and substantial repetition of the procedure detailed in the first paragraph of this example affords 3,4-methylenedioxy-β-nitrostyrene or 3,4-ethylenedioxy-β-nitrostyrene, respectively.

EXAMPLE 2

To a suspension of 20 parts of lithium aluminum hydride in 444 parts of tetrahydrofuran and 177 parts of ethyl ether is added portionwise, over a 1 hour period, a warm solution of 56 parts of 3-benzyloxy-4-methoxy-β-nitrostyrene in 267 parts of tetrahydrofuran. The reaction mixture is refluxed for an additional 2 hours, then is cooled in ice and decomposed by adding 40 parts of water in 71 parts of tetrahydrofuran, followed by 40 parts by volume of a 25 percent by weight aqueous sodium hydroxide solution, followed by 40 parts of water. The salts are removed by filtration and the filtrate is dried over anhydrous calcium sulfate and stripped of solvent under reduced pressure to afford, as an oil, 3-benzyloxy-4-methoxyphenethylamine.

Substitution of a like quantity of 4-benzyloxy-3-methoxy-β-nitrostyrene for the 3-benzyloxy-4-methoxy-β-nitrostyrene used above and substantial repetition of the foregoing procedure affords, as an oil, 4-benzyloxy-3-methoxyphenethylamine.

Substitution of an equivalent quantity of 3,4-methylenedioxy-β-nitrostyrene or 3,4-ethylendioxy-β-nitrostyrene for the substituted β-nitrostyrene called for in the first paragraph of this example and substantial repetition of the procedure there detailed affords 3,4-methylenedioxyphenethylamine or 3,4-ethylenedioxyphenethylamine, respectively.

EXAMPLE 3

A solution of 45 parts of benzoyl chloride in 149 parts of chloroform is added portionwise over a 30 minute period to a solution of 78 parts of 3-benzyloxy-4-methoxyphenethylamine in 72 parts of triethylamine and 596 parts of chloroform. The mixture is stirred at room temperature for an additional 90 minutes. It is then washed twice with water and once with dilute aqueous sodium bicarbonate solution, dried over anhydrous calcium sulfate and stripped to a low volume under reduced pressure. Addition of n-hexane results in crystallization of N-(3-benzyloxy-4-methoxyphenethyl)benzamide. That product melts at about 136°–138°C.

The above procedure is repeated using a like quantity of 4-benzyloxy-3-methoxyphenethylamine in place of the 3-benzyloxy-4-methoxyphenethylamine. There is thus obtained N-(4-benzyloxy-3-methoxyphenethyl)-benzamide, melting at about 128°–130°C.

Substitution of an equivalent quantity of 3,4-methylenedioxyphenethylamine or 3,4-ethylenedioxyphenethylamine for the substituted phenethylamine called for in the first paragraph of this example and substantial repetition of the procedure there detailed affords N-(3,4-methylenedioxyphenethyl)benzamide or N-3,4-ethylenedioxyphenethyl)benzamide, respectively.

EXAMPLE 4

A solution of 64 parts of N-(3-benzyloxy-4-methoxyphenethyl)benzamide and 192 parts of phosphorus oxychloride in 348 parts of toluene is refluxed for three and one-half hours. The solution is stripped in vacuo until a precipitate forms. Ethyl ether is added and the mixture is filtered. The solid residue, which is 6-benzyloxy-7-methoxy-1-phenyl-3,4-dihydroisoquinoline hydrochloride, is dissolved in water. Dilute aqueous sodium hydroxide solution is added and the mixture is extracted with methylene chloride. The methylene chloride extract is dried over anhydrous calcium sulfate and concentrated to a low volume and n-hexane is then added. The crystals which form are separated by filtration. There is thus obtained 6-benzyloxy-7-methoxy-1-phenyl-3,4-dihydroisoquinoline melting at about 144°–145°C.

The above procedure is repeated using a like quantity of N-(4-benzyloxy-3-methoxyphenethyl)benzamide in placed of the N-(3-benzyloxy-4-methoxyphenyl)benzamide. In this manner, there is obtained 7-benzyloxy-6-methoxy-1-phenyl-3,4-dihydroisoquinoline, melting at about 134°–137°C.

Substitution of an equivalent quantity of N-(3,4-methylenedioxyphenethyl)benzamide or N-(3,4-ethylenedioxyphenethyl)benzamide for the substituted benzamide called for in the first paragraph of this example and substantial repetition of the procedure there detailed affords 6,7-methylenedioxy-1-phenyl-3,4-dihydroisoquinoline or 6,7-ethylenedioxy-1-phenyl-3,4-dihydroisoquinoline, respectively.

EXAMPLE 5

A suspension of 38 parts of 6-benzyloxy-7-methoxy-1-phenyl-3,4-dihydroisoquinoline in 435 parts of ethanol is heated to approximately 55°C. 32 Parts of sodium borohydride is added portionwise over a 45 minute period, while maintaining the reaction temperature at 50°–60°C. The mixture is stirred for an additional 3 hours at approximately 50°C. and a precipitate forms. The reaction mixture is then poured into water and the precipitate is separated by filtration, affording 6-benzyloxy-7-methoxy-1-phenyl-1,2,3,4-tetrahydroisoquinoline, melting at about 118°–119°C.

Substitution of a like quantity of 7-benzyloxy-6-methoxy-1-phenyl-3,4-dihydroisoquinoline for the 6-benzyloxy-7-methoxy-1-phenyl-3,4-dihydroisoquinoline used above and substantial repetition of the foregoing procedure gives 7-benzyloxy-6-methoxy-1-phenyl-1,2,3,4-tetrahydroisoquinoline, melting at about 123°–125°C.

Substitution of an equivalent quantity of 6,7-methylenedioxy-1-phenyl-3,4-dihydroisoquinoline or 6,7-ethylenedioxy-1-phenyl-3,4-dihydroisoquinoline for the substituted 3,4-dihydroisoquinoline called for in the first paragraph of this example and substantial repetition of the procedure there detailed affords 6,7-methylenedioxy-1-phenyl-1,2,3,4-tetrahydroisoquinoline or 6,7-ethylenedioxy-1-phenyl-1,2,3,4-tetrahydroisoquinoline, respectively.

EXAMPLE 6

50 Parts of p-fluorobenzaldehyde and 65 parts of 3,4-dimethoxyphenethylamine are combined and heated over a steam bath in a nitrogen atmosphere for 90 minutes. Then 800 parts by volume of 20 percent by weight hydrochloric acid is added and heating is continued for an additional 3 hours. The reaction mixture is cooled, made alkaline with sodium hydroxide and extracted with methylene chloride. The organic layer is dried over anhydrous calcium sulfate and stripped in vacuo to give 6,7-dimethoxy-1-(4-fluorophenyl)-1,2,3,4-tetrahydroisoquinoline. After crystallization from a mixture of ethyl ether and n-hexane, that product melts at about 145°–150°C.

Substitution of an equivalent quantity of p-chlorobenzaldehyde for the p-fluorobenzaldehyde used above and substantial repetition of the foregoing procedure affords 1-(4-chlorophenyl)-6,7-dimethoxy-1,2,3,4-tetrahydroisoquinoline, melting at about 110°–111°C.

EXAMPLE 7

A solution of 25 parts of 3-chloropropionyl chloride in 89.4 parts of chloroform is added portionwise, with stirring, at room temperature, to a solution of 50 parts of 6,7-dimethoxy-1-phenyl-1,2,3,4- tetrahydroisoquinoline and 72.5 parts of triethylamine in 745 parts of chloroform. The addition is carried out over a 30 minute period. Stirring is continued for an additional 90 minutes, at the end of which time the reaction mixture is washed twice with water, dried over anhydrous calcium sulfate and stripped to a low volume under reduced pressure. Addition of n-hexane results in crystallization of 2-(3-chloropropionyl)-6,7-dimethoxy-1-phenyl-1,2,3,4-tetrahydroisoquinoline. That product melts at about 150°C.

Substitution of an equivalent quantity of the appropriate substituted 1,2,3,4-tetrahydroisoquinolines for the 6,7-dimethoxy-1-phenyl-1,2,3,4-tetrahydroisoquinoline used above and substantial repetition of the foregoing procedure affords the following products:

2-(3-Chloropropionyl)-6,7-dimethoxy-1-(4-methoxyphenyl)-1,2,3,4-tetrahydroisoquinoline.
2-(3-Chloropropionyl)-6,7-dimethoxy-1-(3,4-dimethoxyphenyl)-1,2,3,4-tetrahydroisoquinoline.
6-Benzyloxy-2-(3-chloropropionyl)-7-methoxy-1-phenyl-1,2,3,4-tetrahydroisoquinoline.
7-Benzyloxy-2-(3-chloropropionyl)-6-methoxy-1-phenyl-1,2,3,4-tetrahydroisoquinoline.
1-Benzyl-2-(3-chloropropionyl)-6,7-dimethoxy-1,2,3,4-tetrahydroisoquinoline.
1-(4-Chlorophenyl)-2-(3-chloropropionyl)-6,7-dimethoxy-1,2,3,4-tetrahydroisoquinoline.
2-(3-Chloropropionyl)-6,7-dimethoxy-1-(4-fluorophenyl)-1,2,3,4-tetrahydroisoquinoline.
2-(3-Chloropropionyl)-7-methyl-1-phenyl-1,2,3,4-tetrahydroisoquinoline.
2-(3-Chloropropionyl)-6,7-methylenedioxy-1-phenyl-1,2,3,4-tetrahydroisoquinoline.
2-(3-Chloropropionyl)-6,7-ethylenedioxy-1-phenyl-1,2,3,4-tetrahydroisoquinoline.

EXAMPLE 8

Equivalent quantities of 4-chlorobutyryl chloride and 1-phenyl-1,2,3,4-tetrahydroisoquinoline are substituted for the 3-chloropropionyl chloride and 6,7-dimethoxy-1-phenyl-1,2,3,4-tetrahydroisoquinoline used in Example 7 and the procedure described in the first paragraph of that example is substantially repeated. There is thus obtained 2-(4-chlorobutyryl)-1-phenyl-1,2,3,4-tetrahydroisoquinoline.

EXAMPLE 9

5.0 Parts of 2-(3-chloropropionyl)-6,7-dimethoxy-1-phenyl-1,2,3,4-tetrahydroisoquinoline and 5.0 parts of 4-benzylpiperidine are dissolved in 60.4 parts of 2-butanone. The reaction mixture is then placed in a pressure bottle and heated at 60°–65°C. for 2–3 days, during which time solid material forms. The solvent is removed by evaporation and the residue is dissolved in a two-phase system of dilute aqueous sodium hydroxide solution and methylene chloride. The organic layer is separated, dried over anhydrous calcium sulfate and stripped of solvent under reduced pressure. The oil thus obtained is triturated with n-pentane containing a small amount of ethyl ether. The crystals which form are recrystallized from a mixture of methylene chloride and n-hexane, thus affording 2-[3-(4-benzylpiperidino)propionyl]-6,7-dimethoxy-1-phenyl-1,2,3,4-tetrahydroisoquinoline. That product melts at about 127°–128°C. and can be represented by the following structural formula

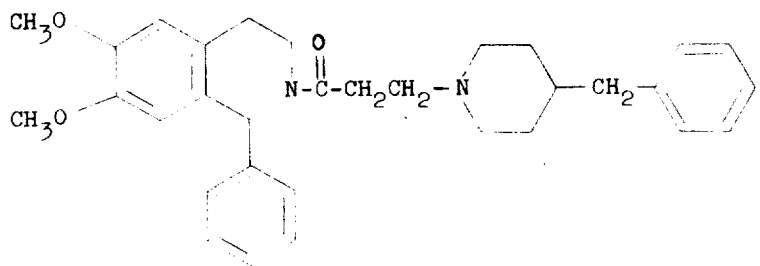

EXAMPLE 10

Substitution of an equivalent quantity of diethylamine for the 4-benzylpiperidine used in Example 9 and substantial repetition of the procedure described in that example affords 2-(3-diethylaminopropionyl)-6,7-dimethoxy-1-phenyl-1,2,3,4-tetrahydroisoquinoline, melting at about 106°–107°C. after crystallization from n-hexane.

In a similar manner, substitution of an equivalent quantity of morpholine for the 4-benzylpiperidine employed in Example 9 and substantial repetition of the procedure detailed in that example affords, as an oil, 6,7-dimethoxy-2-(3-morpholinopropionyl)-1-phenyl-1,2,3,4-tetrahydroisoquinoline. The oil is dissolved in ethanol and a small quantity of concentrated hydrochloric acid in 2-propanol is added. That mixture is heated and ethyl ether is added to the point of incipient crystallization. The crystals which form are separated and recrystallized from a mixture of ethanol and ethyl ether to give 6,7-dimethoxy-2-(3-morpholinopropionyl)-1-phenyl-1,2,3,4-tetrahydroisoquinoline hydrochloride, melting at about 222°–224°C.

When an equivalent quantity of 1-methylpiperazine is substituted for the 4-benzylpiperidine used in Example 9 and the procedure of that example is substantially repeated, there is obtained 6,7-dimethoxy-2-[3-(4-methyl-1-piperazinyl)propionyl]-1-phenyl-1,2,3,4-tetrahydroisoquinoline. That product melts at about 128°–129°C. after crystallization from a mixture of methylene chloride and n-hexane.

EXAMPLE 11

If the appropriate substituted 2-(chloroalkanoyl)-1,2,3,4-tetrahydroisoquinoline is reacted with the appropriate secondary amine according to the procedure described in Example 9, the following compounds are obtained:

2-[3-(4-Benzylpiperidino)propionyl]-6,7-dimethoxy-1-(3,4-dimethoxyphenyl)-1,2,3,4-tetrahydroisoquinoline.

2-(4-Diethylaminobutyryl)-1-phenyl-1,2,3,4-tetrahydroisoquinoline.

7-Benzyloxy-2-(3-diisopropylaminopropionyl)-6-methoxy-1-phenyl-1,2,3,4-tetrahydroisoquinoline.

6-Benzyloxy-2- 3-[N-cyclohexyl(methylamino)]propionyl -7-methoxy-1-phenyl-1,2,3,4-tetrahydroisoquinoline.

1-(4-Chlorophenyl)-6,7-dimethoxy-2-[3-(1-pyrrolidinyl)propionyl]-1,2,3,4-tetrahydroisoquinoline.

6,7-Dimethoxy-1-(4-fluorophenyl)-2-(3-hexamethyleneiminopropionyl)-1,2,3,4-tetrahydroisoquinoline.

EXAMPLE 12

5.0 Parts of 2-(3-chloropropionyl)-6,7-dimethoxy-1-phenyl-1,2,3,4-tetrahydroisoquinoline, 5.0 parts of 4-phenylpiperidine and 7.2 parts of triethylamine are combined with 60.4 parts of 2-butanone. The mixture is then placed in a pressure bottle and heated at 60°–65°C. for 2–3 days, during which time solid material forms. The solvent is removed by evaporation and the residue is dissolved in a two-phase system of dilute aqueous sodium hydroxide solution and methylene chloride. The organic layer is separated, dried over anhydrous calcium sulfate and stripped of solvent under reduced pressure. The residual oil is triturated with n-pentane containing a small amount of ethyl ether. The crystals which form are recrystallized from a mixture of methylene chloride and n-hexane. There is thus obtained 6,7-dimethoxy-1-phenyl-2-[3-(4-phenylpiperidino)propionyl]-1,2,3,4-tetrahydroisoquinoline, melting at about 92°–93°C.

Substitution of an equivalent quantity of 2-(3-chloropropionyl)-6,7-methylenedioxy-1-phenyl-1,2,3,4-tetrahydroisoquinoline or 2-(3-chloropropionyl)-6,7-ethylenedioxy-1-phenyl-1,2,3,4-tetrahydroisoquinoline for the substituted tetrahydroisoquinoline called for above and substantial repetition of the foregoing procedure affords 6,7-methylenedioxy-1-phenyl-2-[3-(4-phenylpiperidino)propionyl]-1,2,3,4-tetrahydroisoquinoline or 6,7-ethylenedioxy-1-phenyl-2-[3-(4-phenylpiperidino)propionyl]-1,2,3,4-tetrahydroisoquinoline, respectively.

EXAMPLE 13

The procedure detailed in the first paragraph of Example 12 is repeated using an equivalent quantity of 1-phenylpiperazine in place of the 4-phenylpiperidine.

The crystals which form are separated to give 6,7-dimethoxy-1-phenyl-2-[3-(4-phenyl-1-piperazinyl)propionyl]-1,2,3,4-tetrahydroisoquinoline, melting at about 83°–85°C. That free base is dissolved in ethanol and a small quantity of concentrated hydrochloric acid in 2-propanol is added. The mixture is heated and ethyl ether is added to the point of incipient crystallization. The crystals which form are separated and identified as 6,7-dimethoxy-1-phenyl-2-[3-(4-phenyl-1-piperazinyl)propionyl]-1,2,3,4-tetrahydroisoquinoline dihydrochloride, melting at about 158°–160°C. That compound can be represented by the following structural formula

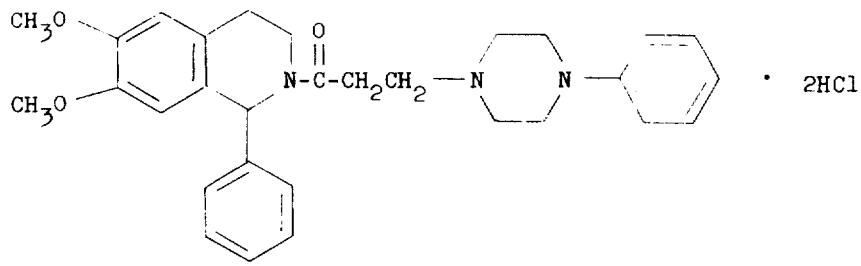

EXAMPLE 14

Substitution of an equivalent quantity of 1-benzyl-2-(3-chloropropionyl)-6,7-dimethoxy-1,2,3,4-tetrahydroisoquinoline for the 2-(3-chloropropionyl)-6,7-dimethoxy-1-phenyl-1,2,3,4-tetrahydroisoquinoline used in Example 12 and substantial repetition of the procedure described in the first paragraph of that example affords 1-benzyl-6,7-dimethoxy-2-[3-(4-phenylpiperidino)propionyl]-1,2,3,4-tetrahydroisoquinoline.

In a similar manner, substitution of equivalent quantities of 1-phenylpiperazine and 2-(3-chloropropionyl)-7-methyl-1-phenyl-1,2,3,4-tetrahydroisoquinoline for the 4-phenylpiperidine and 2-(3-chloropropionyl)-6,7-dimethoxy-1-phenyl-1,2,3,4-tetrahydroisoquinoline employed in the first paragraph of Example 12 and substantial repetition of the procedure there detailed affords 7-methyl-1-phenyl-2-[3-(4-phenyl-1-piperazinyl)propionyl]-1,2,3,4-tetrahydroisoquinoline.

When equivalent quantities of 1-phenylpiperazine and 2-(3-chloropropionyl)-6,7-dimethoxy-1-(4-methoxyphenyl)-1,2,3,4-tetrahydroisoquinoline are substituted for the starting materials used in the first paragraph of Example 12 and the procedure there detailed is substantially repeated, there is obtained 6,7-dimethoxy-1-(4-methoxyphenyl)-2-[3-(4-phenyl-1-piperazinyl)propionyl]-1,2,3,4-tetrahydroisoquinoline.

EXAMPLE 15

2.0 Parts of 2-(3-diethylaminopropionyl)-6,7-dimethoxy-1-phenyl-1,2,3,4-tetrahydroisoquinoline is dissolved in 22.8 parts of methyl iodide and placed in a steam oven at 65°C. for about 16 hours. The reaction mixture is then concentrated under reduced pressure and the residue is dissolved in ethanol. Ethyl ether is added and the mixture is refrigerated until crystallization occurs. Recrystallization from a mixture of ethanol and ethyl ether affords 2-(3-diethylaminopropionyl)-6,7-dimethoxy-1-phenyl-1,2,3,4-tetrahydroisoquinoline methiodide, melting at about 165°–168°C.

EXAMPLE 16

2.0 Parts of 7-benzyloxy-2-(3-diisopropylaminopropionyl)-6-methoxy-1-phenyl-1,2,3,4-tetrahydroisoquinoline is dissolved in approximately 80 parts of methanol. 0.2 Part of a 5% palladium-on-carbon catalyst is added and the mixture is shaken at room temperature and a pressure of about 2 psi for approximately 23 hours or until one molecular equivalent of hydrogen has been absorbed. The catalyst is removed by filtration and the filtrate is concentrated under reduced pressure to give an oil which solidifies upon trituration with n-pentane. That solid is crystallized from a mixture of methylene chloride and n-hexane to afford 2-(3-diisopropylaminopropionyl)-7-hydroxy-6-methoxy-1-phenyl-1,2,3,4-tetrahydroisoquinoline.

The procedure described above is repeated using an equivalent quantity of 6-benzyloxy-2- 3-[N-cyclohexyl(methylamino)]propionyl -7-methoxy-1-phenyl-1,2,3,4-tetrahydroisoquinoline. There is thus obtained 2- 3-[N-cyclohexyl(methylamino)]propionyl -6-hydroxy-7-methoxy-1-phenyl-1,2,3,4-tetrahydroisoquinoline.

What is claimed is:

1. A compound of the formula

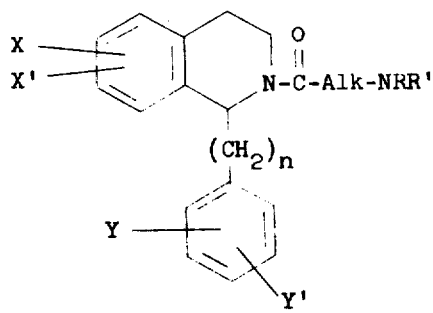

wherein X and X' are each selected from the group consisting of hydrogen, methoxy, hydroxy, benzyloxy and methyl, or X and X' together represent a single methylenedioxy or ethylenedioxy group; Y and Y' are each selected from the group consisting of hydrogen, halogen and methoxy; $n$ is selected from the group consisting of 0 and 1; Alk is lower alkylene separating the atoms attached thereto by at least 2 carbon atoms; and NRR' is selected from the group consisting of di(lower alkyl)amino, N-cyclohexyl-(lower alkylamino), 1-pyrrolidinyl, hexamethyleneimino, morpholino, piperidino, 4-phenylpiperidino, 4-benzylpiperidino, 4-methyl-1-piperazinyl and 4-phenyl-1-piperazinyl.

2. A compound according to claim 1 which is 6,7-dimethoxy-1-phenyl-2-[3-(4-phenyl-1-piperazinyl)propionyl]-1,2,3,4-tetrahydroisoquinoline.

3. A compound according to claim 1 which is 2-[3-(4-benzylpiperidino)propionyl]-6,7-dimethoxy-1-phenyl-1,2,3,4-tetrahydroisoquinoline.

4. A compound according to claim 1 which is 6,7-dimethoxy-1-phenyl-2-[3-(4-phenylpiperidino)propionyl]-1,2,3,4-tetrahydroisoquinoline.

* * * * *